United States Patent [19]

Oyadomari

[11] Patent Number: 5,414,816
[45] Date of Patent: May 9, 1995

[54] DATA TRANSFER APPARATUS HAVING MEANS FOR CONTROLLING THE DIFFERENCE IN SPEED BETWEEN DATA INPUT/OUTPUT PORTS AND MEMORY ACCESS

[75] Inventor: Hajime Oyadomari, Tokyo, Japan

[73] Assignee: NEC Corporation, Tokyo, Japan

[21] Appl. No.: 115,754

[22] Filed: Sep. 3, 1993

Related U.S. Application Data

[63] Continuation of Ser. No. 873,694, Apr. 21, 1992, abandoned, which is a continuation of Ser. No. 451,990, Dec. 18, 1989, abandoned.

[30] Foreign Application Priority Data

Dec. 19, 1988 [JP] Japan .................. 63-318428
Dec. 19, 1988 [JP] Japan .................. 63-318429

[51] Int. Cl.⁶ ............................................. G06F 13/00
[52] U.S. Cl. ........................... 395/275; 364/239.1; 364/239.51; 364/DIG. 1; 364/939.3; 395/250
[58] Field of Search ................. 364/200, 900; 395/275

[56] References Cited

U.S. PATENT DOCUMENTS

| | | | |
|---|---|---|---|
| 3,553,656 | 1/1971 | Bernhardt | 364/900 |
| 3,566,090 | 2/1971 | Johnson | 364/200 |
| 3,639,909 | 2/1972 | Hauck et al. | 364/200 |
| 4,130,864 | 12/1978 | Schlotterer | 364/200 |
| 4,145,755 | 3/1979 | Suzuki et al. | 364/900 |
| 4,171,536 | 10/1979 | Heuer et al. | 364/200 |
| 4,258,418 | 3/1981 | Heath | 364/200 |
| 4,400,771 | 8/1983 | Suzuki et al. | 364/200 |
| 4,423,482 | 12/1983 | Hargrove et al. | 364/200 |
| 4,571,671 | 2/1986 | Burns et al. | 364/200 |
| 4,591,973 | 5/1986 | Ferris, III et al. | 364/200 |
| 4,642,797 | 2/1987 | Hoberman | 364/900 |
| 4,644,463 | 2/1987 | Hutchkin et al. | 364/200 |
| 4,788,638 | 11/1988 | Ogawa et al. | 364/200 |
| 4,805,094 | 2/1989 | Oye et al. | 364/200 |
| 4,807,121 | 2/1989 | Halford | 364/200 |
| 4,821,170 | 4/1989 | Bernick | 364/200 |
| 4,831,523 | 5/1989 | Lewis et al. | 364/200 |
| 4,839,791 | 6/1989 | Ito | 364/200 |
| 4,841,475 | 1/1989 | Ishizuka | 364/900 |
| 4,860,193 | 8/1989 | Bentley et al. | 364/200 |
| 4,991,084 | 2/1991 | Rodiger et al. | 364/200 |
| 5,163,134 | 11/1992 | Kakuse et al. | 395/275 |
| 5,164,939 | 11/1992 | Shobatake | 370/60 |

OTHER PUBLICATIONS

Patent Abstracts of Japan, vol. 12, No. 192 (P-712) (3039) 4 Jun. 1988 & JP-A-69 297 963 (Fujitsu) 25 Dec. 1987 (abstract).
Patent Abstracts of Japan, vol. 8, No. 82 (P-266)(1519) 14 Apr. 1984 & JP-A-58223 861 (Nippon Denshin) 26 Dec. 1983 (abstract).

*Primary Examiner*—Chriostpher B. Shin
*Attorney, Agent, or Firm*—Foley & Lardner

[57] ABSTRACT

A data transfer apparatus includes a plurality of channels and a transfer speed control circuit. A plurality of channels are connected to input/output devices, respectively. Each channel is assigned a corresponding channel number. The transfer speed control circuit is arranged between the channels and a memory. The transfer speed control circuit includes a monitor for monitoring a rate of data transfer from the input/output devices to the memory, and a controller for controlling and decreasing a difference in speed between data sent from the input/output devices and memory access when the monitor result represents a predetermined difference.

3 Claims, 5 Drawing Sheets

DATA TRANSFER APPARATUS HAVING MEANS FOR CONTROLLING THE DIFFERENCE IN SPEED BETWEEN DATA INPUT/OUTPUT PORTS AND MEMORY ACCESS

This application is a continuation of application Ser. No. 07/873,694, filed Apr. 21, 1992, now abandoned, which is a continuation of application Ser. No. 07/451,990, filed Dec. 18, 1989, now abandoned.

BACKGROUND OF THE INVENTION

The present invention relates to a data transfer apparatus for a data processing system.

A conventional data transfer apparatus of this type includes a plurality of memory access flags to perform memory access. Each memory access is assigned to the corresponding channel. As shown in FIG. 2, a memory access time slot of one channel is assigned to a specific machine cycle of one period at the time of memory access. For example, in the memory access, data having a specific data length, e.g., 8-byte data, is exchanged between a memory and an input/output device within a predetermined period, e.g., four machine cycles each assigned to four channels. A memory access buffer is arranged for only one memory access cycle corresponding to, e.g., 8-byte data.

In such a data transfer apparatus, an upper limit of memory access performance of one channel is determined. It is generally considered that the memory access speed is high, and is not lower than a transfer speed of an input/output device.

However, an input/output device such as a semiconductor disk, has been developed, and generations of main frame and peripheral system apparatus do not coincide with each other. Therefore, an input/output device having a transfer speed higher than the memory access speed has been required.

In such a case, speed matching is performed between the input/output device and the data transfer apparatus through an adapter such as a local memory for buffering one block of a data record of the input/output device. However, this speed matching causes an increase in hardware, and a delay of an I/O time period occurs by an access time of the local memory. Therefore, such high-performance input/output device cannot be efficiently used.

SUMMARY OF THE INVENTION

It is a principal object of the present invention to perform a data transfer operation more efficiently than can a conventional apparatus.

It is another object of the present invention to perform a data transfer operation at a higher speed than can a conventional apparatus.

In order to achieve the above objects, according to the present invention, there is provided a data transfer apparatus comprising a plurality of channels which are respectively connected to input/output devices and to which channel numbers are respectively assigned. Transfer speed control means are arranged between these channels and a memory, the transfer speed control means including means for monitoring a rate of data transfer from the input/output devices to the memory, and means for controlling and decreasing a difference in speed between data sent from the input/output devices and memory access when the monitor result represents a predetermined difference.

DETAILED DESCRIPTION OF THE PREFERRED EMBODIMENTS

Preferred embodiments of the present invention will be described hereinafter with reference to the accompanying drawings.

Figure 1:
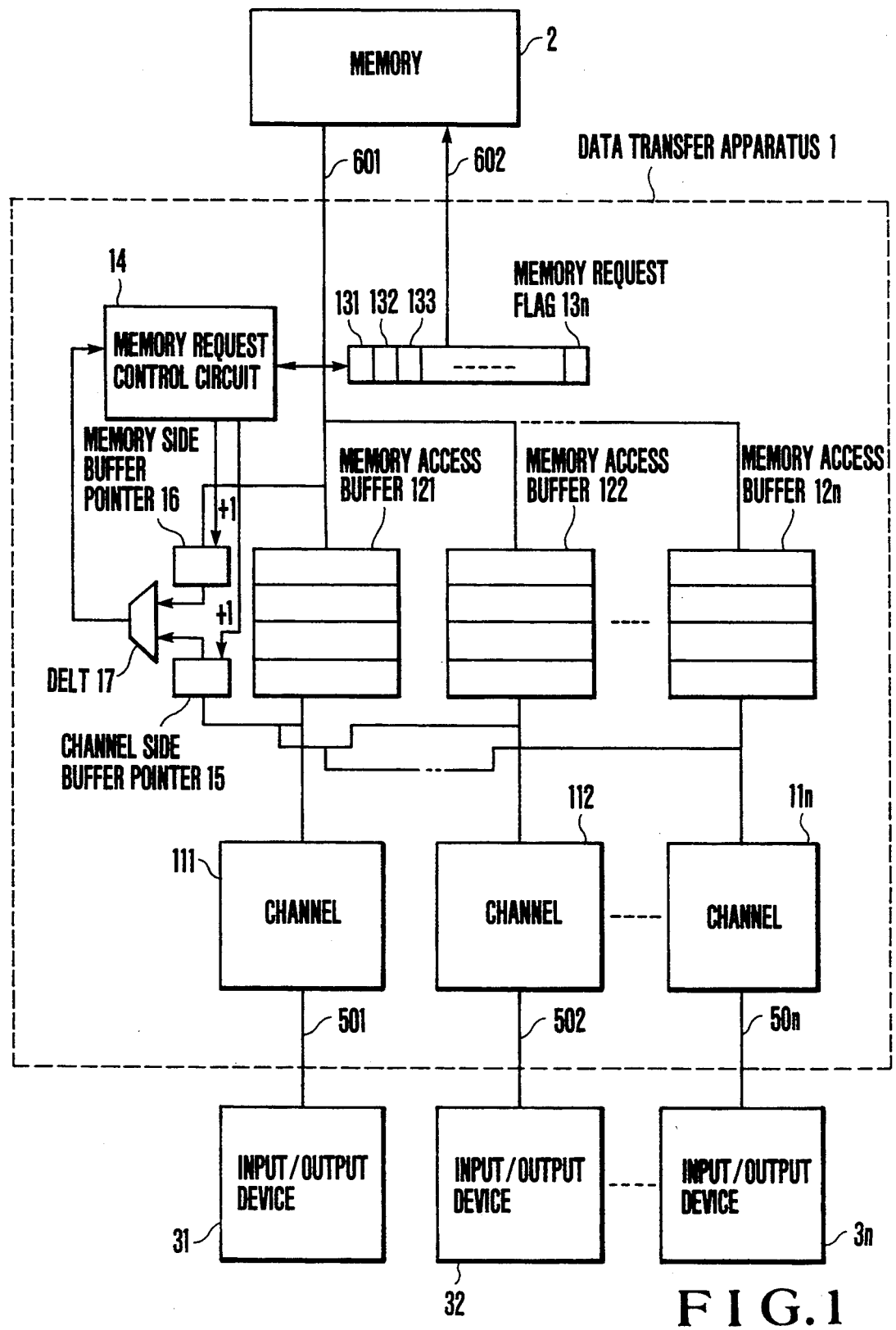
FIG. 1 is a block diagram showing an arrangement of a data processing system which includes a data transfer apparatus according to the first embodiment of the present invention.
Figure 2:
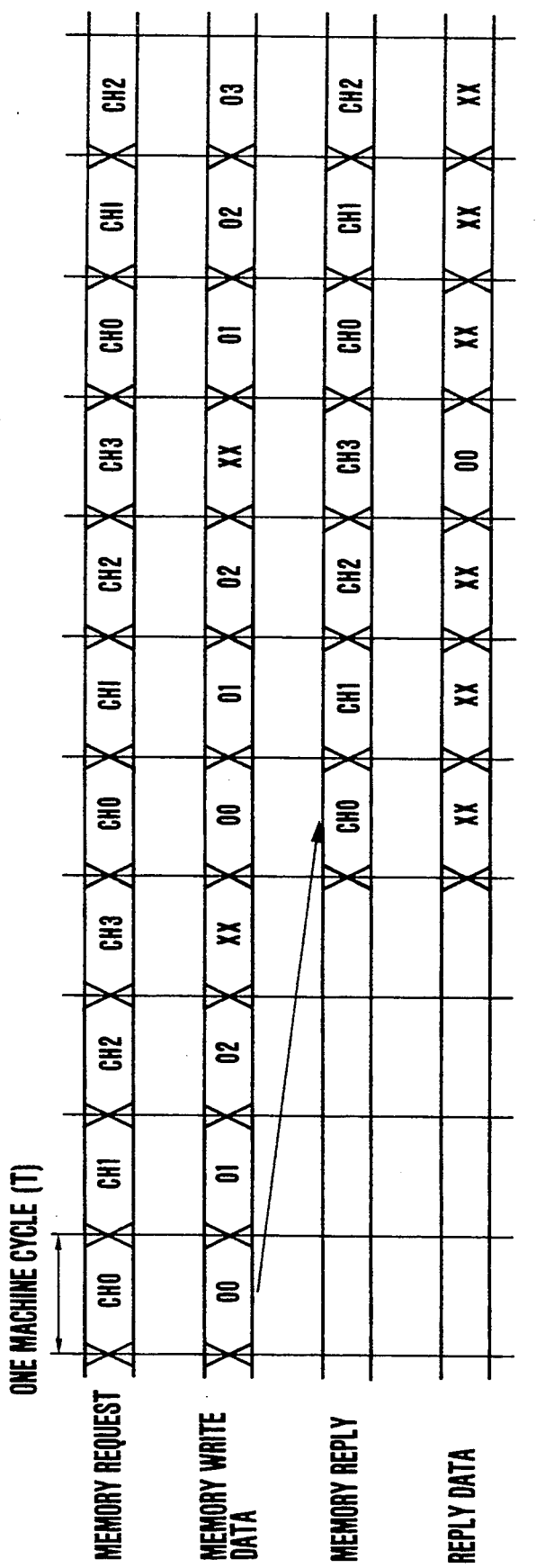
FIG. 2 is a timing chart for explaining the operation of a conventional data transfer apparatus.

Referring to FIG. 1, a data transfer apparatus 1 according to the first embodiment of the present invention is connected to input/output devices 31 to 3n through connecting lines 501 to 50n, respectively. This data transfer apparatus includes channels 111 to 11n to which channel numbers are respectively assigned, memory request flags (MRF) 131 to 13n for controlling memory access to a memory 2 in units of the channels, a plurality of memory access buffers 121 to 12n (4W×8B) which correspond to the channels and are used to perform memory access to the memory 2, a memory-side buffer pointer (PTM) 16 for counting the access count between the memory 2 and the buffers 121 to 12n, a channel-side buffer pointer (PTH) 15 for counting the access count between the channels 111 to 11n and the buffers 121 to 12n, an arithmetic circuit (DELT) 17 for calculating a difference between the content of the memory-side buffer pointer 16 and that of the channel-side buffer pointer 15 to output a difference signal representing this difference, and a memory request control circuit 14 for changing the correspondence between each memory request flag and the corresponding channel number when the difference signal exceeds a predetermined value. The data transfer apparatus performs data transfer between the input/output devices 31 to 3n and the memory 2.

When the input/output device 32 receives an input/output instruction to perform data transfer, first, the pointers PTM 16 and PTH 15 are reset, and an output from the DELT 17 is set at "0".

Assume that the PTH 15 is "+1" when 8-byte data is transferred from the channel 112 to the buffer 122. Since an input operation is performed, an output from the DELT 17 corresponds to PTH - PTM, i.e., goes to "1". The control circuit 14 turns the memory request flag 132 on, and starts memory access to store the 8-byte data in the memory 2. When the end condition of this memory request is returned from the memory 2, the PTM 16 is incremented by one, and an output from the DELT 17 returns to "0" again.

When the next 8-byte data is transferred from the input/output device 32 to increment the PTH 15 by one, the PTH 15 goes to "2". When 8-byte data is fetched again from the channel to the buffer 122 during memory access of the memory request flag 132="1", DELT=2 since PTH=3, and PTM=1. The control circuit 14 determines from an output of the DELT=2 that the transfer speed of the input/output device 32 is higher than the memory access speed, and assigns the memory request flag corresponding to the channel number which is not used, e.g., assigns the memory request flag 131 to the channel 112, thus starting memory access.

Thus, when memory access is performed at a lower speed than that of the input/output device, a multiplexed memory request which can be stored in the buffer 122 can be output. More specifically, since the buffer in this embodiment can store four words, the multiplexed memory request can be output up to a difference between the PTH and PTM, i.e., DELT=4.

When the memory request end condition is returned, the DELT 17 is sequentially decremented, and various memory access modes can be performed in accordance with a transfer speed of the input/output device.

Note that although the above description can be applied to an input operation, an output operation can be performed completely in the same manner as in the above description when an output from the DELT 17 is PTM - PTH,.

Figure 3:
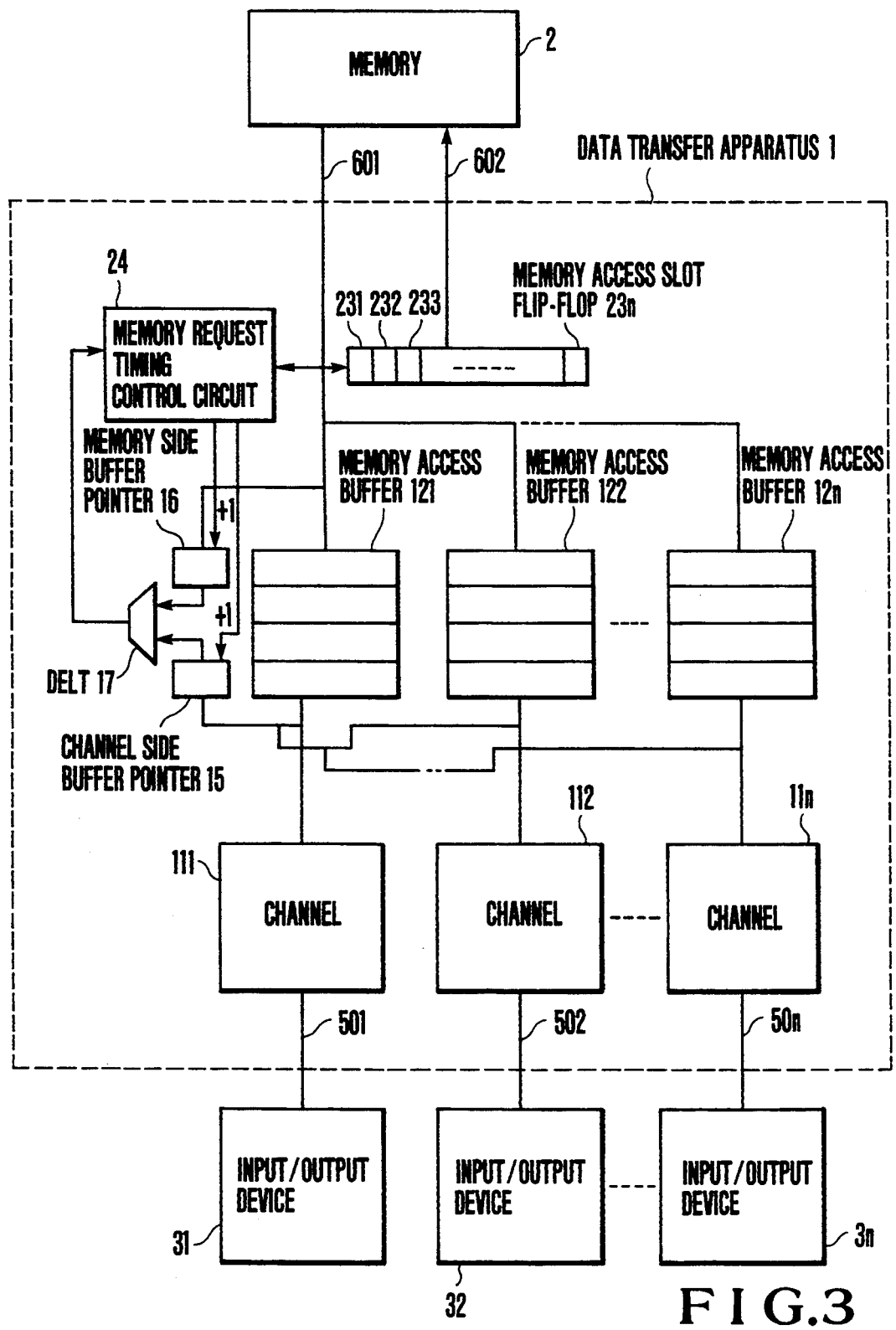
FIG. 3 is a block diagram showing a data transfer apparatus according to the second embodiment of the present invention.

The second embodiment of the present invention is shown in FIG. 3. The second embodiment has the same arrangement as in the first embodiment except for the following. In the second embodiment, a memory request timing control circuit 24 is used in place of the memory request control circuit 14 in FIG. 4 to change a timing of memory access when a difference signal exceeds a predetermined value, and memory access slot flip-flops (MAF) 231 to 23n are used in place of the memory request flags 131 to 13n.

Figure 4:
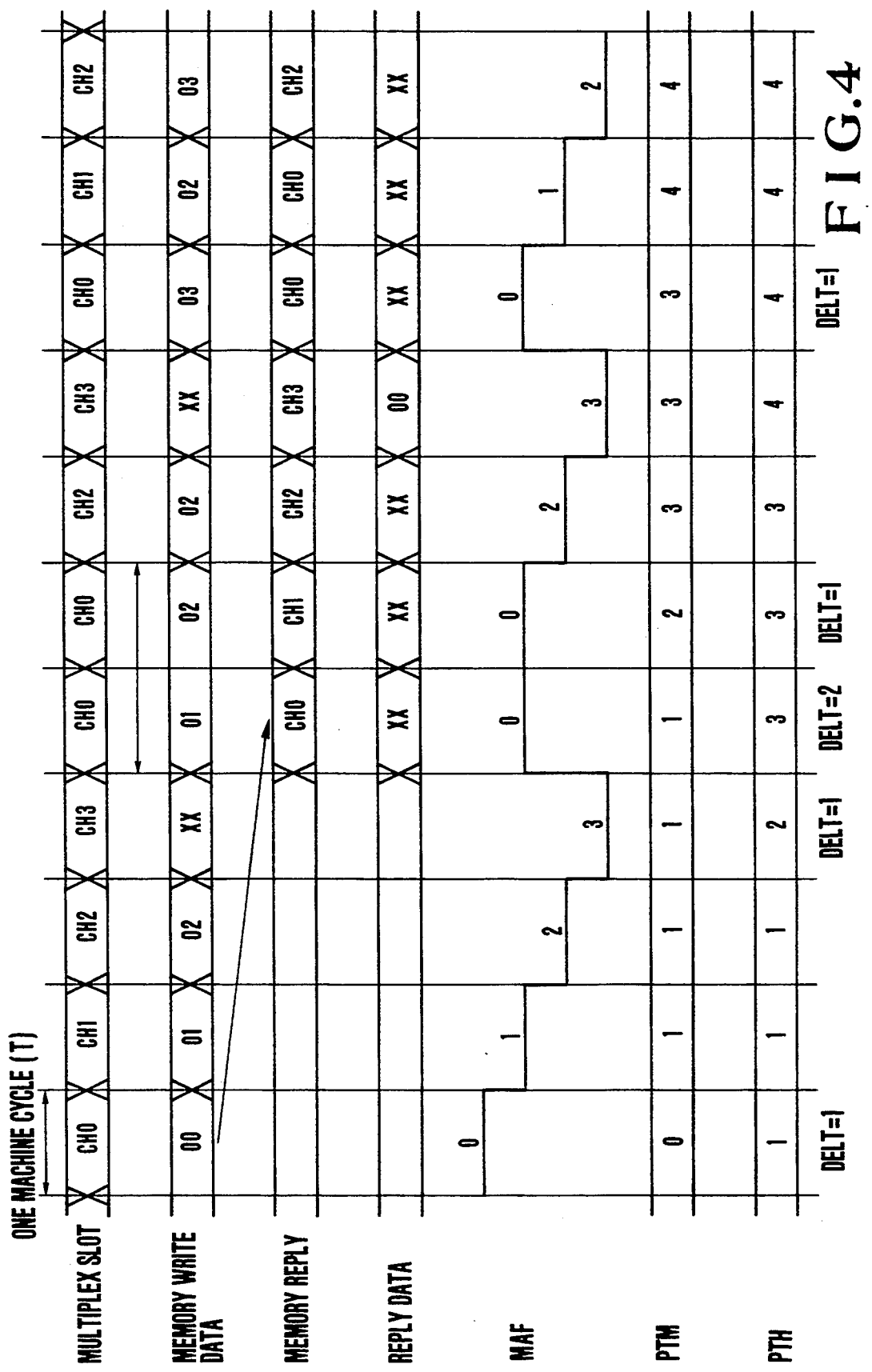
FIG. 4 is a timing chart for explaining the operation of the data transfer apparatus according to the second embodiment of the present invention.

FIG. 4 is a timing chart for explaining memory access in the second embodiment. FIG. 4 indicates that the memory access for the channels (CH0 to CH3) is time-divisionally output during the 4T cycles, normally, and reply is returned during 4T cycles.

When an input/output device 31 is started in response to an input/output instruction, a PTM 16 and a PTH 15 are reset, and a DELT 17 goes to "0". In an input operation, since DELT=PTH - PTM. Therefore, when 8B data is transferred from a channel 111 to a buffer 121, PTH=1, and DELT=1. At this time, if an MAF 231 is set at "1", memory access can be performed. Therefore, memory access is performed, and the PTM is incremented by one in the next cycle, thus returning to DELT=0. When the transfer speed of the input/output device 31 is high, and the next 8B data are continuously supplied from the channel 111, as shown in FIG. 4, DELT=2 may often be obtained.

At this time, the timing control circuit 24 keeps the MAF 231 on during 2T cycles, to skip the succeeding memory access slot of the CH1 (MAF1). Therefore, the memory access of the channel 111 (CH0) is continuously performed during the 2T cycles, and hence the PTM 16 is continuously incremented by one, thus returning to DELT=0.

Thus, since the access cycles of the channel which requires high-speed memory access are time-divisionally multiplexed, in this embodiment, one channel access cycle can be performed by a maximum of a 4 W buffer capacity, i.e., by DELT=4.

All the above operations are input operations. In an output operation, DELT=PTM - PTH is calculated, and the same operations as in the input operations can be performed until the PTM 16 is updated for reply.

As described above, according to this embodiment, when the channel number correspondence of the memory request flag is changed, and the multiplexed memory request is supplied by the data count in the buffer, the flexibility with respect to a transfer speed can be improved, and a high-efficiency data transfer apparatus can be provided. According to this embodiment, in a data transfer apparatus for performing time-divisional memory access in correspondence with the channels, the memory access buffer count is used, and the multiplexed memory access time slot corresponding to the channel is output. Therefore, a high efficient high-speed data transfer apparatus can be provided.

Figure 5:
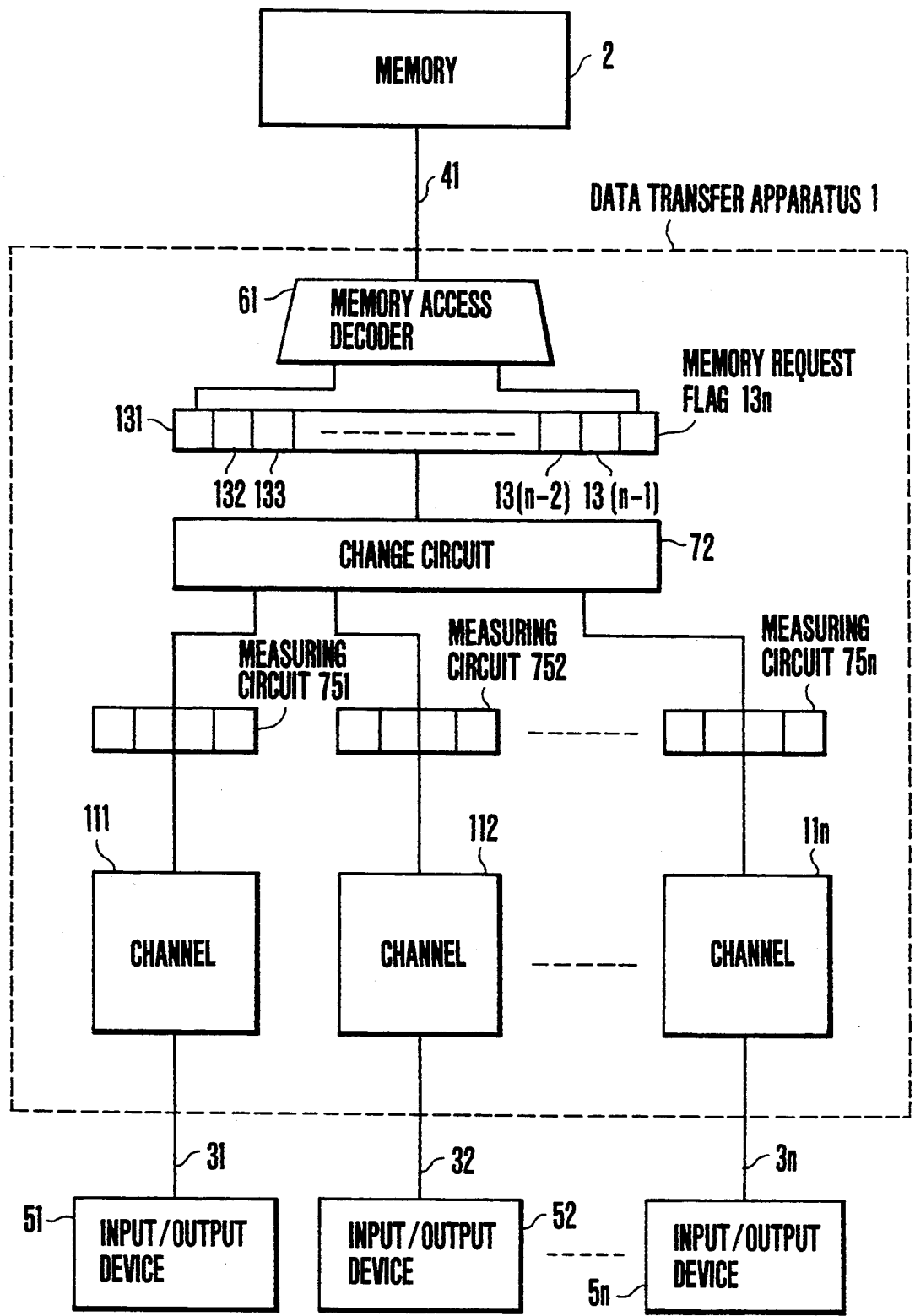
FIG. 5 is a block diagram showing a data transfer apparatus according to the third embodiment of the present invention.

FIG. 5 shows the third embodiment of the present invention. The same reference numerals in FIG. 5 denote the same parts as in FIG. 1. Referring to FIG. 5, a data transfer apparatus 1 is connected to input/output devices 51 to 5n through connecting lines 31 to 3n, respectively. The data transfer apparatus 1 includes channels 111 to 11n, to which channel numbers are respectively assigned, memory request flags 131 to 13n, set to be "1" during memory access, for controlling the memory access to a memory 2 in units of channels, a memory access decoder 61 for decoding the contents of the memory request flags 131 to 13n, measuring circuits 751 to 75n for measuring transfer speeds of the input/output devices 51 to 5n, and a change circuit 72 for changing the correspondence between the memory request flags 131 to 13n and the channel numbers on the basis of the measurement result of the measuring circuits 751 to 75n. The data transfer apparatus 1 performs a data transfer operation between the input/output devices 51 to 5n and the memory 2. The measuring circuits 751 to 75n respectively consist of 4-bit flip-flops (F/Fs), for holding the access counts between the channels and the input/output devices during one memory access cycle.

Assume that an input/output instruction is output from a central processing unit (not shown) to the data transfer apparatus 1 of this embodiment, and a specific channel, e.g., the channel 112, starts the data transfer from/to the input/output device 52 using a connection path 32, and the data transfer from/to the memory 2 using the memory access flag 132.

When the transfer speed of the input/output device 52 is high, and the access count between the channel 52 and the input/output device which exceeds the predetermined value (when a difference occurs with respect to the predetermined value) is measured by the measuring circuit 752 while the memory request flag 132 is ON, the change circuit 72 causes the memory request flag corresponding to the channel which does not perform memory access, e.g., the memory request flag 131, to correspond to the channel 112, thus performing the operation of the memory request. At this time, if the channel 111 starts memory access, the change circuit 72 sequentially changes the correspondence between the memory request flag and the channel, and the memory access of the high-speed input/output device is preferentially processed.

When the preceding memory access is completed, the memory request flag 132 is reset. At the same time, a predetermined value is subtracted in the measuring circuit 752, and the measuring circuit 752 is completely reset when the memory request flag 131 is reset.

Thus, since the high-speed input/output device can perform multiplexed memory access corresponding to a multiple of the predetermined value of the measuring circuit, high-speed memory access can be expected.

As described above, according to the present invention, in the data transfer apparatus including a plurality of memory request flags, when a plurality of memory request flags are assigned to perform memory access of the high-speed input/output device, hardware can be decreased, thus providing a highly efficient data transfer apparatus.

What is claimed is:

1. A data transfer apparatus, comprising:
a plurality of channels, each channel connected to a respective input/output device to which channel numbers are respectively assigned;
transfer speed control means interconnected between said channels and a memory, further including monitoring means for monitoring a number of waiting memory accesses from said input/output devices to said memory in each of said channels, the each waiting memory access being generated in response to a difference between a memory access speed and a data entering/exiting speed of said input/output devices; and
adjusting means, when the monitoring result detects a predetermined difference, for controlling said input/output devices based on the predetermined difference;
wherein, said adjusting means includes a plurality of memory access buffers interconnected between said memory and each of said channels, for storing plural transfer data and accessing said memory;
said monitoring means includes a plurality of memory access slot flip-flops arranged in correspondence with the channel numbers, for controlling a memory access time slot of said memory in said respective channels storing the transfer data in said memory access buffers, a memory-side buffer pointer for counting access counts between said memory and each of said memory access buffers in accordance with said channel numbers, and a channel-side buffer pointer for counting access counts between each of said channels and each of said memory access buffers in accordance with said channel numbers; and
said adjusting means further includes an arithmetic circuit for calculating a difference between the content of said memory-side buffer pointer and that of said channel-side buffer pointer to output a difference signal in each of said channels, and a changing means for changing a memory access timing when the difference signal exceeds a predetermined value, said changing means multiplexing the memory access time slots corresponding to one of said channels of which the difference signal represents the predetermined value.

2. A data transfer apparatus, comprising:
a plurality of channels each connected to a respective input/output device to which channel numbers are respectively assigned;
transfer speed control means interconnected between said channels and a memory, further including a monitoring means for monitoring a number of waiting memory accesses from said input/output devices to said memory in each of said channels, each waiting memory access being generated in response to a difference between a memory access speed and a data entering/exiting speed of said input/output devices; and
adjusting means, when the monitoring result detects a predetermined difference, for controlling said input/output devices based on the predetermined difference;
wherein, said monitoring means include a plurality of memory access buffers interconnected between said memory and each of said channels for storing plural transfer data and accessing said memory, and measuring means for measuring the transfer speed of each of said input/output devices;
said adjusting means including a changing means for changing a correspondence between memory request flags and the channel numbers when the measurement result of said measuring means exceeds a predetermined value, said memory responsive to said memory request flags of a corresponding channel for accessing said transfer data in a corresponding memory access buffer in a time division multiplex fashion said changing means achieving high-speed memory access by assigning at least two of said memory request flags to a given channel when said measuring means measures a transfer speed for greater than a predetermined value in said given channel.

3. A data transfer apparatus, comprising:
a plurality of channels, each said channel connected to a respective input/output device to which channel numbers are respectively assigned;
transfer speed control means interconnected between said channels and a memory, further including monitoring means for monitoring a number of waiting memory accesses from said input/output devices to said memory in each of said channels, the waiting memory accesses being generated in response to a difference between a memory access speed and a data entering/exiting speed of said input/output devices; and
adjusting means, when the monitoring result detects a predetermined difference, for controlling said input/output devices based on the predetermined difference;
wherein; said adjusting means includes a plurality of memory access buffers, which buffers are interconnected between said memory and each of said channels, for storing plural transfer data to access said memory;
said monitoring means, including a plurality of memory request flags assigned in correspondence with the channel numbers, for requesting memory access to said memory in each of said channels by storing the transfer data in said memory access buffers, a memory-side buffer pointer for counting access counts between said memory and each of said memory access buffers in accordance with said channel numbers, and a channel-side buffer pointer for counting access counts between each of said channels and each of said memory access buffers in accordance with said channel numbers;
said adjusting means further including an arithmetic circuit for calculating a difference between the content of said memory-side buffer pointer and that of said channel-side buffer pointer in each of said channels, to output a difference signal; and
changing means for changing a corresponding relationship between said memory request flags and the channel numbers when the difference signal exceeds a predetermined value, said changing means assigning at least one of memory request flags assigned to non-used channel numbers to a used channel number with the predetermined value.

* * * * *